United States Patent [19]

Knapp

[11] Patent Number: 5,677,250

[45] Date of Patent: Oct. 14, 1997

[54] LOW-TEMPERATURE LEAD-FREE GLAZE FOR ALUMINA CERAMICS

[75] Inventor: Randy O. Knapp, Central, S.C.

[73] Assignee: Cooper Industries, Inc., Houston, Tex.

[21] Appl. No.: 638,152

[22] Filed: Apr. 26, 1996

Related U.S. Application Data

[62] Division of Ser. No. 323,936, Oct. 17, 1994, Pat. No. 5,518,968.

[51] Int. Cl.$^6$ .............................. C03C 8/04; H01T 13/00
[52] U.S. Cl. .................. 501/14; 501/26; 501/79; 313/118; 427/126.2; 428/432
[58] Field of Search .................. 313/118; 427/126.2; 428/432; 501/14, 26, 79

[56] References Cited

U.S. PATENT DOCUMENTS

| | | |
|---|---|---|
| 4,084,976 | 4/1978 | Hinton . |
| 4,120,733 | 10/1978 | Knapp . |
| 4,256,497 | 3/1981 | Knapp . |
| 4,624,934 | 11/1986 | Kokubu et al. . |
| 4,746,578 | 5/1988 | Kondo et al. . |
| 4,748,137 | 5/1988 | Nigrin . |

FOREIGN PATENT DOCUMENTS 6149-342  11/1981  Japan ........................ 501/26

*Primary Examiner*—Karl Group
*Attorney, Agent, or Firm*—Fish & Richardson P.C.

[57] ABSTRACT

A lead-free ceramic glaze comprising, by weight:
- (i) between about 27 and 35% $SiO_2$;
- (ii) between about 9 and 15% $Al_2O_3$;
- (iii) between about 26 and 34% $B_2O_3$;
- (iv) between about 4 and 9% BaO;
- (v) up to about 2.5% CaO;
- (vi) between about 3 and 8% SrO;
- (vii) between about 6 and 12% ZnO;
- (viii) up to about 1% $K_2O$;
- (ix) between about 1 and 4% $Li_2O$;
- (x) between about 1.5 and 3% $Na_2O$; and
- (xi) balance of minor impurities.

Also disclosed are ceramic substrates spray coated with such composition and a method for making a lead-free glaze to a ceramic substrate using lower firing temperatures, on the order of 1550° to 1650° F. (843° to 899° C.).

12 Claims, No Drawings

LOW-TEMPERATURE LEAD-FREE GLAZE FOR ALUMINA CERAMICS

This application is a divisional of application Ser. No. 08/323,936, filed Oct. 17, 1994 now U.S. Pat. No. 5,518,968.

BACKGROUND OF THE INVENTION (i) Field of the Invention

The present invention relates to lead-free ceramic glazes and, more particularly, to such glazes which can be applied to a ceramic article such as a spark plug insulator at lower application firing temperatures.

(ii) Description of the Related Art

Glazes are continuous coatings which are usually prepared from fused silicate mixtures and are fusion-bonded to ceramic substrates. A glaze is used on a ceramic substrate to serve one or more of the following purposes: (1) to render the substrate impermeable to liquids and gases; (2) for aesthetic reasons, including covering blemishes and providing decorative effects; (3) to provide protective coatings; and (4) to increase strength.

The exterior portion of a spark plug insulator is exposed to dirt and grease which may result in the formation of an electrically conducting surface and premature failure of the spark plug. Alumina insulator bodies of spark plugs are usually glazed in order to minimize dirt and grease build-up, and to increase the strength and imperviousness of the surface. Depending on the particular properties desired, the glaze can be modified to change the maturing temperature, to add color, or to modify the coefficient of thermal expansion.

Glazes applied to alumina substrates must have a low thermal coefficient of expansion, similar to that of the alumina substrate, to avoid undue stresses which can cause spalling, chipping, cracking or crazing of the glaze; from 6 to 7 microinches per inch per °C. is a typical range of coefficient of thermal expansion for alumina bodies. A glaze with a low coefficient of thermal expansion also strengthens the insulator by inducing compressive stresses at the surface of the glaze-insulator composite. Because glazes involve highly complex multi-component systems, it is difficult to predict the effect of varying or substituting chemical compounds in a glaze formulation, even though general properties of some of the individual components are known. Furthermore, because a glaze is not homogeneous, that is, it may contain one or more dispersed undissolved phases, the ultimate components shown by chemical analysis do not describe a glaze such that the properties are easily predictable.

Because the oxides and carbonates of lead enter into combination with silica and boric acid, lead traditionally had found extensive use in glazes, although over the past decades such usage has been diminished in view of the known toxicity of lead. To this end, numerous lead-free glaze compositions have been developed.

For example, in U.S. Pat. No. 4,084,976, a lead-free glaze composition was disclosed comprising from 50 to 54% by weight $SiO_2$, from 5 to 8% by weight $Al_2O_3$, from 6 to 12% by weight $B_2O_3$, from 4 to 6% by weight CaO, from 2 to 8% by weight MgO, from 2 to 15% by weight BaO, from 5 to 8% by weight SrO, from 1 to 2% by weight ZnO, and from 4 to 6% by weight $Na_2O$, $K_2O$, and $Li_2O$. The composition was applied to an alumina body and fired at 2120° F. (1160° C.) to produce a smooth, uniform coating of high gloss and good strength with no evidence of crazing or devitrification.

Another lead-free glaze composition is disclosed in U.S. Pat. No. 4,120,733. Such composition comprises 48 to 54% $SiO_2$, from 7 to 11% $Al_2O_3$, from 16.5 to 20% $B_2O_3$, from 11 to 14% BaO, from 2 to 3% CaO, from 2 to 2.5% ZnO, from 4.25 to 5.25% $Na_2O$, and from 0.4 to 1% $K_2O$, $Li_2O$ and MgO. Such composition differs from that described in U.S. Pat. No. 4,084,976 and, as a consequence of such differences, matures at temperatures from 80° to 100° F. (44° to 56° C.) lower, when fired under the same conditions. Such lower firing temperature was said to minimize deterioration of kilns and kiln furniture, and reduce the fuel requirements for the production of glazed, alumina bodies.

Finally, U.S. Pat. No. 4,256,497 relates to a lead-free glaze for alumina bodies including 35 to 54% $SiO_2$, 7 to 11% $Al_2O_3$, 17 to 25% $B_2O_3$, 2 to 3% CaO, 2 to 2.5% ZnO, 4.25 to 5% $Na_2O$, 8.5 to 21% SrO, and 0.7 to 1% of a mixture of $K_2O$, $Li_2O$, and MgO. Unlike the previous two lead-free glazes described, that of U.S. Pat. No. 4,256,497 eliminates the BaO component and substantially increases the content of SrO. As a consequence of this difference in composition and corresponding alterations of the amounts of other components of the glaze composition, several specific advantages are realized including lowered toxicity of the SrO-containing glaze as compared with the lead-free glaze containing BaO, thereby further reducing the risk of occupational exposure, lower cost of SrO as compared with BaO, and greater availability of SrO and strontium-bearing minerals when compared to that of baria.

The above composition is coated onto an alumina ceramic and fired at temperatures ranging from 1800° to 2200° F. (982° to 1204° C.). A smooth, uniform glaze of high gloss and good strength was formed and there was observed no evidence of crazing or devitrification in the glaze.

The above discussion makes clear that two significant advancements have been made in the area of ceramic glazes over the past two decades. First, the art has successfully removed lead from such compositions. Second, the art has been able to achieve reductions in the temperatures at which such glazes must be fired after they are applied to a ceramic substrate.

Despite such advancements, however, still further reductions in firing temperatures for lead-free glazes are being sought in the art. More particularly, in the manufacture of a spark plug, it has been necessary to carry out two separate firing steps on an already sintered bisque alumina insulator. First, it has been necessary to glost fire raw-glazed insulators at 2050°–2150° F. (1121°–1177° C.). By "raw-glazed insulators" is meant the ceramic component of the spark plug. It has then been necessary to carry out a second firing step at reduced temperatures, e.g., between 1550° and 1650° F. (843° and 899° C.), to incorporate a Carbon-based, Fired-In Suppressor glass seal that results in the production of spark plug core assemblies. By "core assembly" is meant a glazed insulator with a contained internal center electrode component. Reduced temperatures are required in view of the temperature-sensitive nature of certain of the components of the Carbon-Based Fired-In Suppressor glass seal. Quite clearly, the necessity for carrying out two separate firing steps adds to both the cost and the time involved in glazing and glass sealing the unit. It would therefore be advantageous to provide a lower-temperature lead-free glaze which could be co-fired in a single step with the Carbon-Based Fired-In Suppressor glass seal.

SUMMARY AND OBJECTS OF THE INVENTION

In view of the reduced tolerance of certain ceramic materials, such as spark plug core assemblies including a Fired-in Suppressor Seal system, to the high temperatures conventionally employed in firing a glaze, as well as other more obvious advantages to employing lower temperatures in glazing such as reduced energy consumption and reduced wear on equipment, it should be apparent that there still exists a need in the art for lead-free glazes which can be applied to an underlying ceramic article at reduced firing temperatures yet otherwise meet the material requirements for such glazes. It is, therefore, a primary object of the present invention to fulfill that need by providing a lead-free ceramic glaze which can be applied to an underlying ceramic via reduced firing temperatures.

It is a further object of the present invention to provide a low temperature lead-free ceramic glaze which otherwise meets the requirements of conventional glaze compositions such as rendering a substrate impermeable to liquids and gases, providing better product appearance, protecting the underlying article, and increasing the strength of the glaze/body composite beyond that of the underlying article alone.

Yet another object of the present invention is to provide a low temperature lead-free ceramic glaze which can be applied and fired with a Fired-In Suppressor Seal system used in spark plug core assemblies.

Still another object of the present invention is to provide a low temperature lead-free ceramic glaze which can be fired at a temperature which is 250° to 400° F. (121° to 204° C.) below that of the lead-free ceramic glazes of the prior art.

In a first aspect, the present invention relates to a lead-free ceramic glaze comprising, by weight:

(i) between about 27 and 35% $SiO_2$;
(ii) between about 9 and 15% $Al_2O_3$;
(iii) between about 26 and 34% $B_2O_3$;
(iv) between about 4 and 9% BaO;
(v) up to about 2.5% CaO;
(vi) between about 3 and 8% SrO;
(vii) between about 6 and 12% ZnO;
(viii) up to about 1% $K_2O$;
(ix) between about 1 and 4% $Li_2O$;
(x) between about 1.5 and 3% $Na_2O$; and
(xi) balance of minor impurities.

In a second aspect, the present invention relates to a spark plug including an alumina insulator coated with the above composition.

In a third aspect, the present invention relates to a method for applying a lead-free glaze to a ceramic article comprising the steps of (i) coating the ceramic article with a slurry including the above composition and having a solids content between about 40 and 60% and (ii) firing the coated ceramic article at a temperature between 1550° and 1650° F. (843° and 899° C.).

In a fourth aspect, the present invention relates to a method for making a spark plug core assembly including a bisque fired alumina insulator component and a fired-in suppressor glass seal component comprising the steps of spraying a glaze onto the alumina insulator component and simultaneously firing both the alumina insulator component and the suppressor glass seal component to form a glazed and glass sealed core assembly, the firing being carried out at a temperature ranging between 1550° and 1650° F. (843° and 899° C.).

With the foregoing as well as other objects, advantages, and features of the invention that will become hereinafter apparent, the nature of the invention may be more clearly understood by reference to the following detailed description of the invention and to the appended claims.

DETAILED DESCRIPTION OF PREFERRED EMBODIMENTS (i) The ceramic glaze composition The lead-free ceramic glaze of the present invention comprises, by weight:

(i) between about 27 and 35% $SiO_2$;
(ii) between about 9 and 15% $Al_2O_3$;
(iii) between about 26 and 34% $B_2O_3$;
(iv) between about 4 and 9% BaO;
(v) up to about 2.5% CaO;
(vi) between about 3 and 8% SrO;
(vii) between about 6 and 12% ZnO;
(viii) up to about 1% $K_2O$;
(ix) between about 1 and 4% $Li_2O$;
(x) between about 1.5 and 3% $Na_2O$; and
(xi) balance of minor impurities.

Included among the impurities are $TiO_2$, $Fe_2O_3$, and MgO. As compared to the lead-free glazes of the prior art, it should be apparent that the lead-free glaze of the present invention includes reduced amounts of $SiO_2$, increased amounts of $B_2O_3$, increased amounts of ZnO, and reduced amounts of $Na_2O$.

In general, the individual oxides which are present in the instant invention possess the following properties. The $SiO_2$ is microscopically miscible at all temperatures. Control of the amount of silica is important, since if the silica is too high, the glaze normally becomes excessively refractory; if the silica is too low, the glaze in many cases, depending on other ingredients present, can become too soluble and, therefore, unstable. It is the amount and character of the other elements present that greatly modify the effect of the silica present. The alumina increases the viscosity and retards macrocrystalline growth. High viscosity is undesirable in a glaze because it prevents healing of pinholes, scratches, and other minor flaws. The alkalies are strong fluxes and increase the fluidity of the molten glaze. Increasing the amount of alkali compounds present in the glaze increases the coefficient of thermal expansion, and has a direct bearing upon crazing of the glaze. The alkaline earths also act as vigourous fluxes, in a glaze composition. For example, CaO acts as a flux at temperatures of 2,000° F. (1093° C.) and above; excess calcia can cause loss of refractoriness and devitrification, leading to a low-gloss matte texture, possibly as the result of formation of anorthite ($CaO.SiO_2$). Magnesia acts as a vigorous flux at higher temperatures, and lowers the coefficient of thermal expansion to a much greater degree than other bases.

(ii) Application of the ceramic glaze to a ceramic substrate.

In general, the lead-free ceramic glaze of the present invention may be applied to any high alumina ceramic substrate which is typically coated with a glaze. Included among such substrates are chemical laboratory ware, washers, spacers, tubes, electrical circuit components, power delivery insulators, sound isolation tiles, etc. A particularly preferred substrate according to the present invention is a spark plug insulator, which itself is typically made of 85 to 95% by weight alumina. The primary purpose of coating a spark plug insulator with the glaze composition of the invention is to strengthen the spark plug and to protect the exterior of the spark plug insulator from dirt and grease which can form an electrically conducting surface, resulting in premature failure of the sparkplug.

To apply the glaze composition of the invention, the glaze is formulated into a water-based slip or slurry in accordance with techniques well known in the art. Typically, the slip is prepared by combining the glaze composition described above with water and possibly other minor ingredients well known in the art to form a slip having a solids content ranging between about 40 and 60%. As understood by persons in the art, the slip may include, in addition to the carrier and the ceramic oxides in frit form, other raw material components such as naturally occurring ones like feldspar, limestone and clays. One particularly preferred additive is a binder such as emulsified wax, starch (STARAMIC), polyvinyl alcohol (PVA), methylcellulose, etc. The slip is applied to the ceramic substrate by roller flooding, dipping or spraying.

After application of the slip to the ceramic substrate, the coated article is fired. According to the present invention, such firing can be carried out at a temperature well below that heretofore employed, i.e., between 1550° and 1650° F. (843° and 899° C.) if applied by spraying. A temperature between 1700° and 1800° F. (927° and 982° C.) is required for roll-on and dipped applications. Typically, firing is carried out in a glost kiln for a period between 10 and 90 minutes. The firing cycle and its duration are designed to render a smooth, uniform glaze coating of high gloss and good strength. The breaking strength of insulators with the glaze is typically 40–60% above that of bisque ware without glaze.

(iii) Examples

The following examples are given by way of illustration and in no way should be construed as limiting the subject matter disclosed and claimed.

EXAMPLE 1

Bisque-fired spark plug insulators including 90% alumina were coated, by means of (1) spraying with a glaze slip composition including 55% by weight of solids and (2) rolling on a glaze slip composition including 45% by weight solids and comprising:

TABLE 1

LOW-TEMPERATURE LEAD-FREE GLAZE FOR ALUMINA CERAMICS NOMINAL PREFERRED OXIDE FORMULATION*

| OXIDE | PERCENT BY WEIGHT |
|---|---|
| $SiO_2$ | 33.3 |
| $Al_2O_3$ | 10.9 |
| $B_2O_3$ | 28.4 |
| BaO | 6.5 |
| CaO | 2.2 |
| SrO | 4.2 |

TABLE 1-continued

LOW-TEMPERATURE LEAD-FREE GLAZE FOR ALUMINA CERAMICS NOMINAL PREFERRED OXIDE FORMULATION*

| OXIDE | PERCENT BY WEIGHT |
|---|---|
| ZnO | 9.3 |
| $K_2O$ | 0.5 |
| $Li_2O$ | 1.9 |
| $Na_2O$ | 2.6 |
| $TiO_2$, $Fe_2O_3$, MgO | 0.2 |

*Formulae reported herein represent fired compositions, disregarding volatization, if any, of oxide ingredients during firing.

The spray-coated ceramic was then fired at 1625° F. (885° C.) for 15 minutes to form a smooth, uniform glaze of high gloss and good strength. There was no evidence of crazing or devitrification in the glaze and there was achieved a strength increase of about 46% over bisque. The ceramic coated by rolling on was fired at 1775° F. (968° C.) for 30 minutes and gave a 52% increase over bisque.

EXAMPLES 2–12

The above procedure was repeated with similar results for glazes of the following compositions:

TABLE II

EXAMPLES 2–12
LOW-TEMPERATURE LEAD-FREE GLAZES FOR ALUMINA CERAMICS
OXIDE FORMULAE IN WEIGHT PERCENT

| OXIDE | 2 | 3 | 4 | 5 | 6 | 7 | 8 | 9 | 10 | 11 | 12 |
|---|---|---|---|---|---|---|---|---|---|---|---|
| $SiO_2$ | 27.1 | 27.4 | 27.8 | 30.8 | 31.0 | 31.5 | 32.0 | 32.3 | 32.5 | 33.0 | 34.9 |
| $Al_2O_3$ | 14.8 | 14.4 | 13.9 | 10.0 | 12.9 | 9.1 | 13.1 | 12.0 | 11.0 | 11.1 | 9.2 |
| $B_2O_3$ | 33.7 | 33.3 | 33.0 | 30.4 | 29.8 | 29.7 | 29.5 | 29.0 | 28.5 | 28.3 | 26.9 |
| BaO | 4.5 | 4.8 | 5.1 | 7.7 | 6.4 | 8.3 | 5.1 | 6.4 | 7.7 | 7.0 | 7.7 |
| CaO | 0.2 | 0.2 | 0.2 | 0.1 | 0.2 | 0.1 | 2.2 | 1.2 | 0.1 | 1.2 | 2.1 |
| SrO | 7.7 | 7.4 | 7.1 | 4.7 | 5.3 | 4.1 | 5.3 | 4.7 | 4.1 | 4.1 | 3.0 |
| ZnO | 6.4 | 6.9 | 7.4 | 11.0 | 9.2 | 12.0 | 7.4 | 9.2 | 11.1 | 10.1 | 11.1 |
| $K_2O$ | 0.2 | 0.2 | 0.2 | 0.3 | 0.3 | 0.3 | 0.5 | 0.4 | 0.3 | 0.4 | 0.6 |
| $Li_2O$ | 3.5 | 3.4 | 3.2 | 2.2 | 2.4 | 1.9 | 2.4 | 2.2 | 1.9 | 1.9 | 1.4 |
| $Na_2O$ | 1.8 | 1.9 | 2.0 | 2.6 | 2.3 | 2.8 | 2.3 | 2.4 | 2.6 | 2.6 | 2.9 |
| Minor Impurities, $TiO_2$, $Fe_2O_3$, MgO | 0.1 | 0.1 | 0.1 | 0.2 | 0.2 | 0.2 | 0.2 | 0.2 | 0.2 | 0.3 | 0.2 |

In the above examples, the spray coated ceramic substrate was fired at a temperature of 1625° F. (885° C.) for 15 minutes.

The following table sets forth the overall net compositional ranges of components for the low-temperature glaze:

TABLE III

OVERALL NET COMPOSITION RANGES OF COMPONENTS LOW-TEMPERATURE GLAZE

| OXIDE | PERCENT BY WEIGHT |
|---|---|
| $SiO_2$ | 27.1–34.9 |
| $Al_2O_3$ | 9.1–14.8 |
| $B_2O_3$ | 26.9–33.7 |
| BaO | 4.5–8.3 |
| CaO | 0.1–2.2 |
| SrO | 3.0–7.7 |
| ZnO | 6.4–12.0 |
| $K_2O$ | 0.2–0.6 |

TABLE III-continued

OVERALL NET COMPOSITION RANGES OF COMPONENTS
LOW-TEMPERATURE GLAZE

| OXIDE | PERCENT BY WEIGHT |
|---|---|
| $Li_2O$ | 1.4–3.5 |
| $Na_2O$ | 1.0–2.9 |
| Minor Impurities $TiO_2$, $Fe_2O_3$, $MgO$ | 0.1–0.3 |

It will be appreciated that the ultimate composition of the above glaze, containing ten or more oxides, is complex. Nonetheless, even though it is not possible to predict quantitatively the behavior of a glaze, it is desirable that some degree of comprehension and control be achieved.

The raw materials of glazes are almost always oxides or compounds that can be expressed as oxides, thus enabling the components to be described in terms of phase compositions having known characteristics. Because of this, glaze ceramists commonly use a system of expressing oxide compositions in terms of molar proportions, i.e., molecular equivalents. By means of molecular equivalents, an empirical oxide formula can be calculated for each glaze composition.

For purposes of arriving at an empirical molecular formula, all oxides are classified as either basic, neutral (amphoteric), or acid. The glaze oxides which are classified as bases, that is, the alkali metal and alkaline earth oxides, are designated as "$R_2O$" and "RO" respectively. The neutral or amphoteric oxides are designated as "$R_2O_3$" and acid oxides are designated as "$RO_2$."

On an empirical molecular formula basis, the glaze composition set forth in Example 1 is shown in the table below:

Thus, there is achieved according to the present invention a lead-free ceramic glaze which can be fired at temperatures about: 250°–400° F. (121°–204° C.) below those necessary to fire prior art formulations. Nonetheless, the lead-free ceramic glazes of the present invention provide the requisite properties of a glaze in terms of strength and protection provided to an underlying ceramic substrate.

Although only preferred embodiments of the invention are specifically illustrated and described above, it will be appreciated that many modifications and variations of the present invention are possible in light of the above teachings and within the purview of the appended claims without otherwise departing from the spirit and intended scope of the invention.

What is claimed is:

1. A ceramic substrate coated with a lead-free ceramic glaze composition comprising, by weight:

(i) between about 27 and 35% $SiO_2$;

(ii) between about 9 and 15% $Al_2O_3$;

(iii) between about 26 and 34% $B_2O_3$;

(iv) between about 4 and 9% BaO;

(v) up to about 2.5% CaO;

(vi) between about 3 and 8% SrO;

(vii) between about 6 and 12% ZnO;

(viii) up to about 1% $K_2O$;

(ix) between about 1 and 4% $Li_2O$;

(x) between about 1.5 and 3% $Na_2O$; and (xi) balance of minor impurities.

2. The ceramic substrate of claim 1 wherein said substrate is an alumina insulator of a spark plug.

3. A ceramic substrate coated with a lead-free ceramic glaze composition comprising, by weight:

TABLE IV

PREFERRED LOW-TEMPERATURE GLAZE
CHEMICAL ANALYSTS/OXIDE FORMULATION

| CHEMISTRY OXIDE | CHEMISTRY SYMBOL | WEIGHT % | MOLECULAR WEIGHT | MOLES (Wt./Molecular Wt.) | "NORMALIZED MOLE FRACTION" |
|---|---|---|---|---|---|
| $SiO_2$ | $RO_2$ | 33.28 | 60.1 | 0.5537 | 1.596 |
| $Al_2O_3$ | $R_2O_3$ | 10.93 | 102.0 | 0.1072 | 0.309 |
| $B_2O_3$ | $R_2O_3$ | 28.45 | 69.6 | 0.4088 | 1.178 |
| BaO | RO | 6.45 | 153.3 | 0.0421 | 0.121 |
| CaO | RO | 2.17 | 56.1 | 0.0387 | 0.112 |
| SrO | RO | 4.16 | 103.6 | 0.0402 | 0.116 |
| ZnO | RO | 9.29 | 81.4 | 0.1141 | 0.329 |
| $K_2O$ | $R_2O$ | 0.54 | 94.2 | 0.0057 | 0.016 |
| $Li_2O$ | $R_2O$ | 1.91 | 29.9 | 0.0639 | 0.184 |
| $Na_2O$ | $R_2O$ | 2.62 | 62.0 | 0.0423 | 0.122 |
| Minor Impurities, $TiO_2$, $Fe_2O_3$ & MgO | Minor Impurities, $TiO_2$, $Fe_2O_3$ & MgO | Trace | N/A | N/A | N/A |

In establishing the empirical formula for a glaze, the formula is "normalized" so that the sum of $R_2O$ and RO is brought to unity. In Example I, the sum of RO plus $R_2O$ equals 0.347 mole; dividing each of the "MOLES" obtained by the total moles of RO and $R_2O$ establishes the empirical formula for the glaze, given in the last column as "Normalized Mole Fraction." By means of the empirical formula, the calculation of batch weights or the determination of the proportions of ingredients required to produce a glaze having a given formula is simplified, especially if it is desired to formulate the glaze from compounds other than oxides, such as for example, carbonates. Comparison of glaze formulations is thereby greatly simplified.

(i) between about 27.1 and 34.9% $SiO_2$;

(ii) between about 9.1 and 14.8% $Al_2O_3$;

(iii) between about 26.9 and 33.7% $B_2O_3$;

(iv) between about 4.5 and 8.3% BaO;

(v) between about 0.1 and 2.2% CaO;

(vi) between about 3.0 and 7.7% SrO;

(vii) between about 6.4 and 12% ZnO;

(viii) between about 0.2 and 0.6% $K_2O$;

(ix) between about 1.4 and 3.5% $Li_2O$;

(x) between about 1 and 2.9% $Na_2O$; and (xi) balance of minor impurities.

4. The ceramic substrate of claim 3 wherein said substrate is an alumina insulator of a spark plug.

5. A ceramic substrate coated with a lead-free ceramic glaze comprising composition, by weight:
   (i) about 33% $SiO_2$;
   (ii) about 11% $Al_2O_3$;
   (iii) about 28.5% $B_2O$; $O_3$;
   (iv) about 6.5% BaO;
   (v) about $_2$% CaO;
   (vi) about 4% SrO;
   (vii) about 9.5% ZnO;
   (viii) about 0.5% $K_2O$;
   (ix) about 2% $Li_2O$;
   (x) about 2.5% $Na_2O$; and
   (xi) balance of minor impurities.

6. The ceramic substrate of claim 5 wherein said substrate is an alumina insulator of a spark plug.

7. A method for applying a lead-free glaze to a ceramic comprising the steps of (i) spraying said ceramic with a slurry including a composition comprising:
   (i) between about 27 and 35% $Si_2O_2$;
   (ii) between about 9 and 15% $Al_2O_3$;
   (iii) between about 26 and 34% $B_2O_3$;
   (iv) between about 4 and 9% BaO;
   (v) up to about 2.5% CaO;
   (vi) between about 3 and 8% SrO;
   (vii) between about 6 and 12% ZnO;
   (viii) up to about 1% $K_2O$;
   (ix) between about 1 and 4% $Li_2O$; and
   (x) between about 1.5 and 3% $Na_2O$;
and having a solids content between about 40 and 60% and (ii) firing said coated ceramic at a temperature between 1550° and 1650° F.

8. A method for applying a lead-free glaze to a ceramic comprising the steps of (i) spraying said ceramic with a slurry including a composition comprising:
   (i) between about 27.1 and 34.9% $SiO_2$;
   (ii) between about 9.1 and 14.8% $Al_2O_3$;
   (iii) between about 26.9 and 33.7% $B_2O_3$;
   (iv) between about 4.5 and 8.3% BaO;
   (v) between about 0.1% and 2.2% CaO;
   (vi) between about 3.0 and 7.7% SrO;
   (vii) between about 6.4 and 12% ZnO;
   (viii) between about 0.2% and 0.65 $K_2O$;
   (ix) between about 1.4 and 3.5% $Li_2O$; and
   (x) between about 1 and 2.9% $Na_2O$;
and having a solids content between about 40 and 60% and (ii) firing said coated ceramic at a temperature between 1550° and 1650° F.

9. A method for applying a lead-free glaze to a ceramic comprising the steps of (i) spraying said ceramic with a slurry including a composition comprising:
   (i) about 33% $SiO_2$;
   (ii) about 11% $Al_2O_3$;
   (iii) about 28.5% $B_2O_3$;
   (iv) about 6.5% BaO;
   (v) about 2% CaO;
   (vi) about 4% SrO;
   (vii) about 9.5% ZnO;
   (viii) about 0.5% $K_2O$;
   (ix) about 2% $Li_2O$; and
   (x) about 2.5% $Na_2O$;
and having a solids content between about 40 and 60% and (ii) firing said coated ceramic at a temperature between 1550° and 1650° F.

10. A method for making a spark plug core assembly including a bisque fired alumina insulator component and a fired-in suppressor glass seal component comprising the steps of spraying a glaze onto the alumina insulator component and simultaneously firing both said alumina insulator component and said suppressor glass seal component to form a glazed and glass sealed core assembly, said firing being carried out at a temperature ranging between 1550° and 1650° F.

11. The method according to claim 10 wherein the glaze comprises
   (i) between about 27 and 35% $Si_2O_2$;
   (ii) between about 9 and 15% $Al_2O_3$;
   (iii) between about 26 and 34% $B_2O_3$;
   (iv) between about 4 and 9% BaO;
   (v) up to about 2.5% CaO;
   (vi) between about 3 and 8% SrO;
   (vii) between about 6 and 12% ZnO;
   (viii) up to about 1% $K_2O$;
   (ix) between about 1 and 4% $Li_2O$; and
   (x) between about 1.5 and 3% $Na_2O$.

12. The method according to claim 10 wherein the glaze comprises
   (i) between about 27.1 and 34.9% $SiO_2$;
   (ii) between about 9.1 and 14.8% $Al_2O_3$;
   (iii) between about 26.9 and 33.7% $B_2O_3$;
   (iv) between about 4.5 and 8.3% BaO;
   (v) between about 0.1% and 2.2% CaO;
   (vi) between about 3.0 and 7.7% SrO;
   (vii) between about 6.4 and 12% ZnO;
   (viii) between about 0.2% and 0.65 $K_2O$;
   (ix) between about 1.4 and 3.5% $Li_2O$; and
   (x) between about 1 and 2.9% $Na_2O$.

* * * * *